Figure 1:
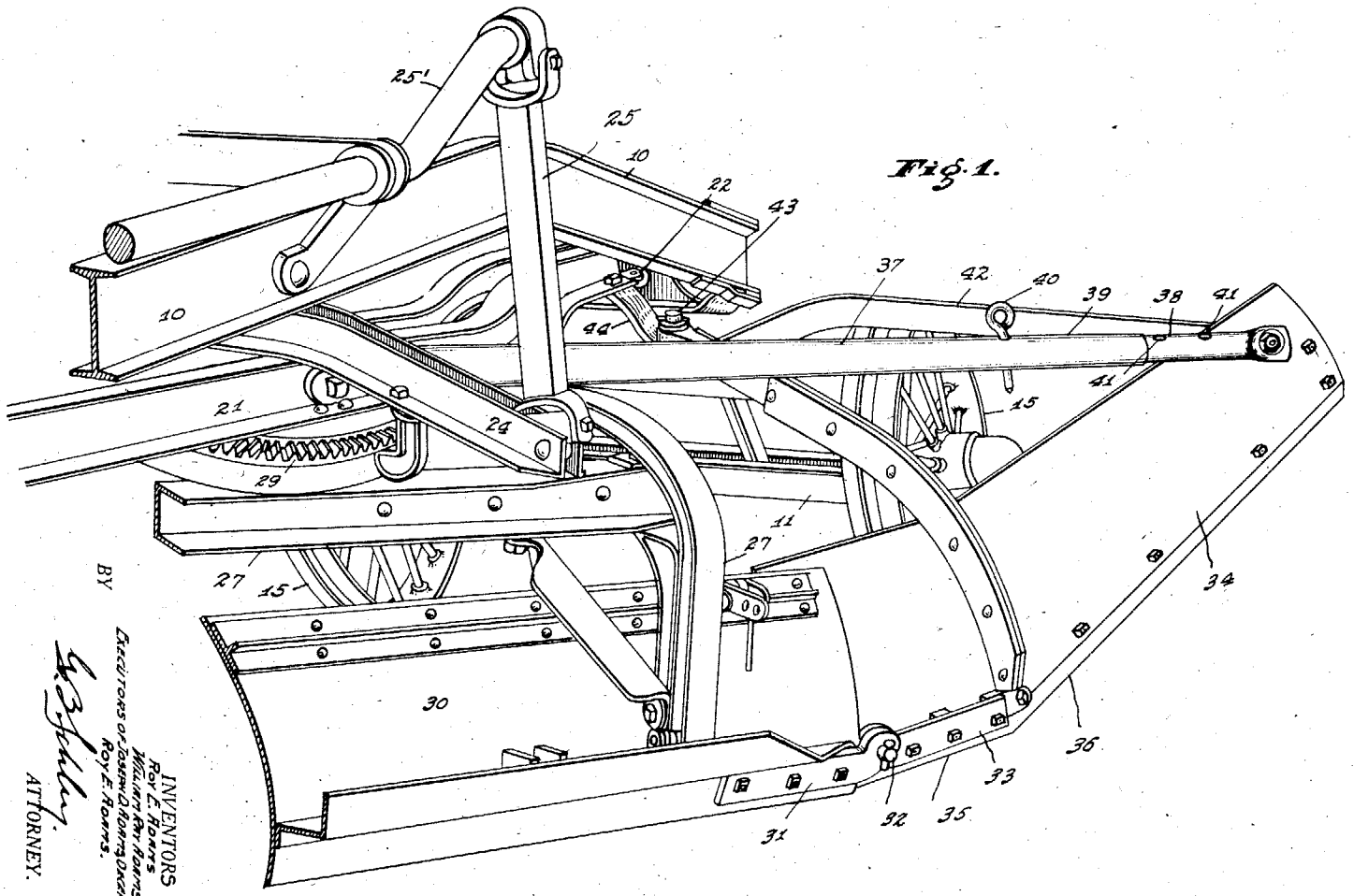

Nov. 3, 1925.

Re. 16,200

J. D. ADAMS ET AL

DITCH FORMING GRADER

Original Filed Aug. 23 1920 2 Sheets-Sheet 1

INVENTORS
ROY E. ADAMS
WILLIAM RAY ADAMS.
EXECUTORS OF JOSEPH D. ADAMS, DECEASED.
ROY E. ADAMS.

BY G. B. Schley.
ATTORNEY.

Nov. 3, 1925.

Re. 16,200

J. D. ADAMS ET AL

DITCH FORMING GRADER

Original Filed Aug. 23, 1920

2 Sheets-Sheet 2

INVENTORS
ROY E. ADAMS
WILLIAM RAY ADAMS,
EXECUTORS OF JOSEPH D. ADAMS, DECEASED.
ROY E. ADAMS.

BY G. B. Ashby.
ATTORNEY.

[redacted]
155

Reissued Nov. 3, 1925. Re. 16,200

UNITED STATES PATENT OFFICE.

JOSEPH D. ADAMS, DECEASED, LATE OF INDIANAPOLIS, INDIANA, BY ROY E. ADAMS AND WILLIAM RAY ADAMS, OF INDIANAPOLIS, INDIANA, ADMINISTRATORS, AND ROY E. ADAMS, OF INDIANAPOLIS, INDIANA, ASSIGNORS TO J. D. ADAMS & COMPANY, A PARTNERSHIP COMPOSED OF ROY E. ADAMS, WILLIAM RAY ADAMS, LEONA H. ADAMS, AND HELEN J. ADAMS AS INDIVIDUALS, AND ROY E. ADAMS, WILLIAM RAY ADAMS, AND S. E. HENRY AS TRUSTEES.

DITCH-FORMING GRADER.

Original No. 1,507,552, dated September 2, 1924, Serial No. 405,318, filed August 23, 1920. Application for reissue filed June 6, 1925. Serial No. 35,503.

*To all whom it may concern:*

Be it known that JOSEPH D. ADAMS, deceased, formerly a citizen of the United States, and a resident at Indianapolis, in the county of Marion and State of Indiana, and ROY E. ADAMS, a citizen of the United States, residing at Indianapolis, in the county of Marion and State of Indiana, have invented a new and useful Ditch-Forming Grader, of which the following is a specification.

It is the object of this invention to provide a road grader with a bank sloper attachment, which is preferably removable whereby with a single operation the bottom and outside slope of a ditch at the side of the road may be worked at the same time that the inside slope of the ditch is worked, and the entire quantity of dirt from both slopes of the ditch may be carried out to and placed on the road to build it up and give it its proper crowning.

In carrying out the invention, there is attached to the outer end of the mold board or blade a supplemental blade, preferably by a pivotal attachment whereby the vertical angle between the two may be adjusted to vary the angle between the outer and inner slopes of the ditch. This supplemental blade is attached to the forward end of the oblique main blade, and is preferably in substantially the same vertical plane as the main blade; so that in operation the outer end of the supplemental blade is the farthest advanced, and the dirt is fed from the outside slope of the ditch down into and up the inside slope of the ditch onto the road by reason of the obliqueness of the entire blade combination, formed of the main blade and the supplemental blade, with respect to the direction of travel. In order to get the full advantage of this supplemental blade, it is preferred to use it on graders in which the wheels are tiltable to leaning positions, and in which the back wheels are laterally shiftable to make them travel in any desired path; so that the front and rear wheels on that side of the grader which is toward the ditch may travel in the ditch and all the wheels may be made to lean to resist the tendency of the reaction of the dirt on the blades, particularly on the supplemental blade, to draw the entire grader into the bank, thus holding the machine properly in the desired line of travel.

Figures 2, 3:
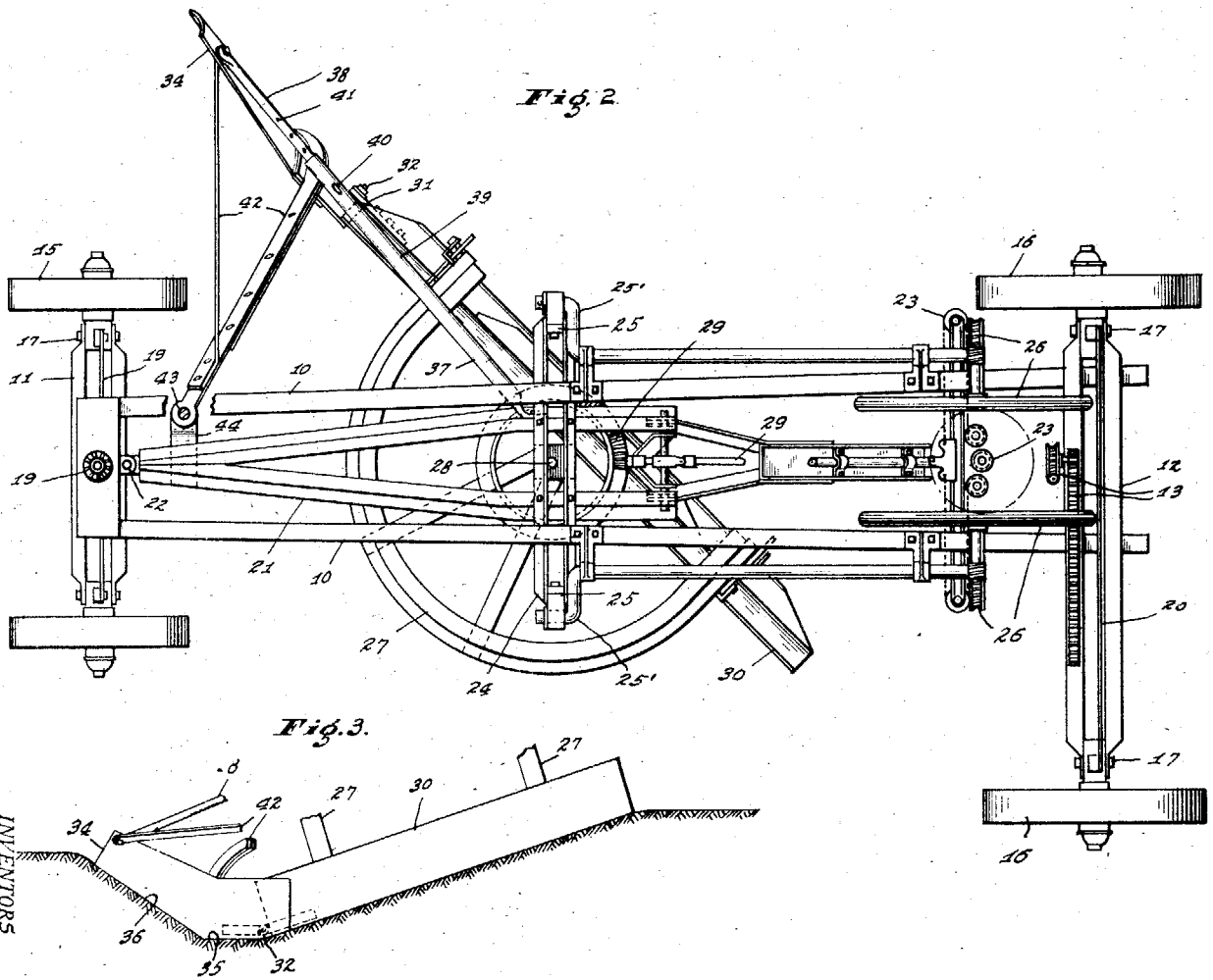

The accompanying drawings illustrate the invention: Fig. 1 is a fragmentary perspective view of the front part of a leaning-wheel road grader equipped with a back-sloper blade in accordance with the invention, the main blade and the frame of the machine being shown only in part; Fig. 2 is a plan of the complete machine, but with the controlling mechanism in the main omitted; and Fig. 3 is a diagrammatic cross section through a road and ditch, showing the action of the main and supplemental blades thereon.

The grader comprises a main frame 10 connecting a front axle 11 and a rear axle 12, the front axle being mounted to turn on a suitable king bolt for guiding purposes, and the rear axle being slidable transversely of the frame by suitable operating mechanism 13. The front and the rear axles are provided with suitable carrying wheels 15 and 16 respectively, each of which is pivotally connected to its axle on a horizontal axis 17 which permits it to be tilted to any desired leaning position in either direction from the vertical. The tilting of the front wheels is controlled in common by suitable operating mechanism 19, and that of the rear wheels by suitable operating mechanism 20. The operating mechanisms 13, 19, and 20 are shown only sufficiently to indicate their character. The forward end of a sub-frame 21 is loosely pivoted on a pivot pin 22 near the front end of the main frame 10, and the rear end of such sub-frame 21 is slidable transversely of the main frame 10 by suitable operating mechanism 23. The two ends of a cross bar 24 on the sub-frame 10 are supported by two rigid links 25 from two adjustable lifting devices 25′, separately operable by suitable mechanism 26 whereby the two sides of the sub-frame may be raised or lowered relatively to each other, the pivoting of the sub-frame on the pin 22 being sufficiently loose to permit this. A mold-board frame 27 is carried by the sub-frame 21, and is circumferentially adjustable about a pivotal center 28 by suitable operating mechanism 29, to vary the angle of the mold board or blade 30, carried by such mold-board frame 27, with respect to the direction of travel of the grader. All of these operating mechanisms referred to are shown only generally because they are now well known.

On the rear side of the mold board or main blade 30 near the bottom thereof at the right hand end (with reference to the direction of travel) is bolted a hinge member 31, which is connected by a hinge pin 32 to a similar hinge member 33 bolted to the back of a supplemental blade 34. This supplemental blade is the one which forms the bottom and outside slope of the ditch, and for that purpose its lower or cutting edge is preferably made of two parts 35 and 36 at an angle to each other to form the desired vertical angle between the bottom and outside slope of the ditch. The hinge pin 32 is transverse to the two blades, to allow the vertical angle between the main and supplemental blades to be varied as desired; and to vary this angle the outer end of the supplemental blade 34 is connected to the sub-frame 21 by an adjustable bar 37, which is made adjustable in length by being formed of two telescoping members 38 and 39 which may be locked in any desired relative position by a cross pin 40 co-operating with suitable holes 41 in such members, a series of such holes 41 being provided in one of the members. By varying the length of the adjustable bar 37, the vertical angle between the main and supplemental blades is varied. By swinging the supplemental blade sufficiently high it becomes possible to use the main blade 30 in regular road grader operation without interference from the supplemental blade, and yet with the supplemental blade well out of the way. Though it is thus not necessary to remove the supplemental blade when working the grader without it, it can be removed when desired by disconnecting it at the pivot pin 32.

In order to pull the supplemental blade forward, it is provided with its own draft frame 42, in the form of two diverging arms connected at their rear ends to separated points on the supplemental blade, one of them preferably extending down around the back of such supplemental blade to the hinge member 33. The two arms of this frame are joined at their forward ends, and are connected to a suitable pin 43 carried by a lateral arm 44 fixed to the forward end of the sub-frame 21. The connection of the draft frame 42 to the pin 43 is sufficiently loose so that it does not interfere with the raising and lowering of the supplemental blade to obtain the desired adjustment of the latter. The draft frame 42 is ordinarily not adjustable in length (though this is not necessarily the case), so that when the supplemental blade is in use the main blade 30 must be at substantially a predetermined horizontal angle with respect to the sub-frame 21, and that end of the main blade to which the supplemental blade is attached must be the advanced end. In effect, the supplemental blade then becomes a vertically adjustable continuation of the main blade, with the outer end of the supplemental blade the farthest advanced of the entire blade combination.

In operation, the grader is drawn forward by any suitable draft device, and usually has its right hand wheels in line with each other, as shown, and traveling in the ditch at the right hand side of the road. The rear axle 12 of the grader is adjusted to get this alinement of such right hand wheels. As the grader is drawn forward, the outer end of the supplemental blade digs into the outer bank of the ditch, and cuts the dirt therefrom and moves it down into the ditch by the action of the edge 36 and by the angle of the blade with respect to the direction of travel. The edge 35 of the supplemental blade forms the bottom of the ditch, and the dirt which is fed down into the ditch from the outer slope and that which is cut from the bottom of the ditch are fed together to the inside slop of the road and in front of the advanced end of the main mold board 30. This mold board or main blade 30 forms the inside slope of the ditch, or the outer edge of the main road, and carries toward the crown of the road not only the dirt which it itself cuts away but also the dirt which is fed to it from the outside slope of the ditch and the bottom of the ditch by the supplemental blade 34, thus building up the road.

When the grader is traversing uneven ground, the hand wheels 26 may be operated to elevate, lower, or tilt the ground-cutting element including the main and supplemental blades in order to cut a smooth ditch at the desired grade. The rigid, thrust-transmitting links 25, insure that the ground-cutting element will be definitely held in the desired position relative to the frame of the grader, and make it possible to throw substantially the entire weight of the grader onto the ground-cutting element to force the cutting element into the ground when deep cuts are to be taken.

Because of the obliqueness of the blade combination with respect to the direction of travel, with the part which co-operates with the outer slope of the ditch farthest advanced, the reaction of the dirt on the blades tends to draw the whole grader into the bank; and this is effectively resisted by tilting the leaning wheels 15 and 16 toward the crown of the road so that they resist such

155 tendency to draw into the bank. If the draft device, such as a tractor, is traveling well upon the road, the draft connection may also tend to counteract the tendency to dig into the bank, and then the front wheels need not lean so far toward the road, if at all, or may in some cases even lean in the other direction. It is possible with this grader to form the entire ditch and both its inner and outer slopes without requiring the grader proper to travel on the outer slope.

The invention claimed is:

1. A ditch-forming road grader, comprising the combination of a wheel-supported frame and a ground-cutting element, two adjustable lifting devices mounted on said frame and operable independently of each other, and thrust-transmitting members connecting said lifting devices with transversely spaced points on said cutting element, said cutting element including two blade members vertically angularly adjustable relative to each other.

2. A ditch-forming road grader, comprising the combination of a wheel-supported frame, a ground-cutting element, and control means mounted on said frame and connected to said ground-cutting element for adjusting it angularly in a vertical plane, said ground-cutting element including two blade members vertically angularly adjustable relative to each other, said blade members being oblique to the direction of travel of the road grader.

3. A ditch-forming road grader, comprising the combination of a wheel-supported frame and a ground-cutting element, said ground-cutting element being angularly adjustable in a vertical plane and including a main blade and a supplemental blade vertically angularly adjustable relative to each other, said blades being oblique to the direction of travel of the road grader and the outer end of said supplemental plate being in advance of the inner end thereof.

4. A ditch-forming road grader, comprising the combination of a wheel-supported frame and a ground-cutting element, two adjustable lifting devices mounted on said frame and operable independently of each other, and thrust-transmitting members connecting said lifting devices with transversely spaced points on said cutting element, said cutting element including a main blade and a supplemental blade vertically angularly adjustable relative to each other, said supplemental blade projecting laterally beyond the supporting wheels.

5. A ditch-forming road grader, comprising the combination of a wheel-supported frame and a ground-cutting element, two adjustable lifting devices mounted on said frame and operable independently of each other, and thrust-transmitting members connecting said lifting devices with transversely spaced points on said cutting element, said cutting element including a main blade and a supplemental blade vertically angularly adjustable relative to each other, said supplemental blade having a cutting edge formed of two parts at an angle to each other for forming the bottom and outer slope of a ditch.

6. A ditch-forming road grader, comprising the combination of a main frame, wheels for supporting said main frame, and a ground-cutting element, said ground-cutting element being angularly adjustable in a vertical plane and including a supplemental blade adapted to form the outer slope of a ditch, said wheels being tiltable to counteract the tendency of said supplemental blade to cut into such outer ditch slope.

7. A ditch-forming road grader, comprising the combination of a main frame, wheels for supporting said main frame, and a ground-cutting element, said ground-cutting element being angularly adjustable in a vertical plane and including a supplemental blade adapted to form the outer slope of a ditch, said wheels being adjustable so that their planes of rotation may be changed relative to said frame to counteract the tendency of said supplemental blade to cut into such outer ditch slope.

8. A ditch-forming road grader, comprising the combination of a main frame, wheels for supporting said main frame, and a ground-cutting element, said ground cutting element being angularly adjustable in a vertical plane and including a supplemental blade adapted to form the outer slope of a ditch, at least one of said supporting wheels being adjustable so that its plane of rotation may be changed relative to said frame to counteract the tendency of said supplemental blade to cut into the outer ditch slope.

9. A ditch-forming road grader, comprising the combination of a wheel-supported frame and a ground-cutting element, and control means mounted on said frame for angularly adjusting said cutting element as a unit in a vertical plane and for forcing said cutting element downward, said cutting element including two blade members vertically angularly adjustable relative to each other.

10. A ditch-forming road grader, comprising front and rear axles, wheels for supporting said axles, a rigid main frame connecting said axles, a ground-cutting element, adjustable lifting means mounted on said frame, and thrust-transmitting means connecting said lifting means with said cutting element, said cutting element being laterally adjustable relative to said main frame and including two blade members vertically angularly adjustable relative to each other.

11. A ditch-forming road grader, comprising front and rear axles, wheels for supporting said axles, a rigid main frame connecting said axles, a ground-cutting element, two adjustable lifting devices mounted on said frame and operable independently of each other, and thrust-transmitting members connecting said lifting devices with transversely spaced points on said cutting element, said cutting element including two blade members vertically angularly adjustable relative to each other.

12. A ditch-forming road grader as set forth in claim 11 with the addition that said main frame is laterally adjustable on said rear axle.

13. A ditch-forming road grader, comprising a combination of a wheel-supported frame, a ground-cutting element, and control means mounted on said frame and connected to said ground-cutting element for bodily adjusting it in height relative to said frame and also for angularly adjusting it in a vertical plane, said ground cutting element including two blade members vertically angularly adjustable relative to each other, the cutting edges of said two blade members lying wholly in a single plane oblique to the direction of travel of the road grader.

14. A ditch-forming road grader, comprising front and rear axles, wheels for supporting said axles, a rigid main frame connecting said axles, said main frame being adjustable on said rear axles transversely of the grader, a ground-cutting element including two blade members vertically angularly adjustable relative to each other, and control means mounted on said main frame and connected to said ground-cutting element for angularly adjusting it in a vertical plane.

15. A ditch-forming road grader, comprising front and rear axles, wheels for supporting said axles, a rigid main frame connecting said axles, a sub-frame, the front end of said sub-frame being supported near the front of the road grader, two independently operable lifting devices mounted on said main frame, thrust-transmitting members connecting said lifting devices with transversely spaced points on said sub-frame, a main blade carried by said sub-frame, and a supplemental blade vertically angularly adjustable relative to said main blade, said sub-frame and said two blades being adjustable as a unit by said two lifting devices.

16. A ditch-forming road grader as set forth in claim 9, with the addition of means for adjusting the rear end of said sub-frame transversely of said main frame.

In witness whereof we have hereunto affixed our signatures.

ROY E. ADAMS.
WM. RAY ADAMS.
*Executors of the Estate of J. D. Adams, Deceased.*

ROY E. ADAMS.